United States Patent
Kida et al.

(10) Patent No.: US 7,286,319 B2
(45) Date of Patent: Oct. 23, 2007

(54) DISK DRIVE WRITE CONTROL BY SERVO GAIN

(75) Inventors: Takashi Kida, Kawasaki (JP); Kazunori Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/445,744

(22) Filed: Jun. 2, 2006

(65) Prior Publication Data

US 2007/0217049 A1    Sep. 20, 2007

(30) Foreign Application Priority Data

Mar. 17, 2006    (JP) .............................. 2006-075005

(51) Int. Cl.
*G11B 5/596*    (2006.01)
(52) U.S. Cl. .................................. 360/78.14
(58) Field of Classification Search ............. 360/78.14, 360/75, 78.09, 78.08, 77.08, 31, 48, 78.06, 360/77.04; 369/31, 30.17
See application file for complete search history.

(56) References Cited

U.S. PATENT DOCUMENTS

| | | | | |
|---|---|---|---|---|
| 4,835,752 A | * | 5/1989 | Nakatsu et al. | 369/30.17 |
| 5,333,083 A | * | 7/1994 | Nakano | 360/77.04 |
| 5,541,784 A | * | 7/1996 | Cribbs et al. | 360/75 |
| 6,011,668 A | * | 1/2000 | Choi | 360/78.06 |
| 6,469,852 B1 | * | 10/2002 | Nakagawa | 360/48 |
| 7,016,132 B2 | * | 3/2006 | Sato et al. | 360/31 |
| 2007/0058502 A1 | * | 3/2007 | Huang et al. | 369/44.35 |

FOREIGN PATENT DOCUMENTS

| | | |
|---|---|---|
| JP | 9-139040 | 5/1997 |
| JP | 2001-229637 | 8/2001 |
| JP | 2005-141798 | 6/2005 |
| JP | 2005-243105 | 9/2005 |

\* cited by examiner

*Primary Examiner*—Fred F. Tzeng
(74) *Attorney, Agent, or Firm*—Greer, Burns & Crain, Ltd.

(57) ABSTRACT

A method of controlling a disk drive is disclosed that is capable of precise and real-time detection of an abnormal floating height of a magnetic head over an entire area of a magnetic disk. The method of controlling the disk drive includes the steps of: calculating a servo gain difference between a servo gain value obtained from a servo frame of the disk drive and a normal servo gain value recorded in the servo frame, the normal servo gain value being a servo gain value when a magnetic head flies normally relative to a magnetic disk; and forbidding the magnetic head writing data into the magnetic disk when the servo gain difference is equal to or greater than a predetermined value.

12 Claims, 7 Drawing Sheets

DISK DRIVE WRITE CONTROL BY SERVO GAIN

BACKGROUND OF THE INVENTION

1. Field of the Invention

The present invention relates to a disk drive control method, a disk drive, and a write control circuit, and particularly, to a disk drive control method, a disk drive, and a write control circuit able to prevent write operations when floating height of a head is abnormal.

2. Description of the Related Art

Magnetic disk drives, such as hard disk drives (HDDs) are widely used in computers as storage media. The HDD includes a magnetic disk, a magnetic head for reading data from or writing data into the magnetic disk, and an actuator for holding a slider on which the magnetic head is fixed.

The actuator is driven by a voice coil motor (VCM) to rotate, and due to the rotation of the actuator, the magnetic head is driven to move in the radial directions on the magnetic disk; thereby, the magnetic head is driven to be able to access any place on the magnetic disk to read data from or write data into the magnetic disk.

A suspension is provided at the front end of the actuator, and the slider is fixed on the suspension. The slider has a surface facing the magnetic disk, which is called an "ABS" (Air Bearing Surface)". When the magnetic disk is rotating, an air flow occurs between the ABS and the magnetic disk, and the slider flies relative to the magnetic disk. In this state, the distance between the magnetic head and the magnetic disk (it is referred to as "floating height") is stable at a position where the force from the actuator and a lifting force due to the air flow are in balance.

In HDDs fabricated in recent years, along with increased recording density of the HDDs, the floating height tends to be small. For this reason, the floating height of the magnetic head may become unstable because of presence of contamination, or non-uniformity of a lubricant on the surface on the recording medium, or changes of the shape of the magnetic head caused by a writing current when writing data in the magnetic disk, so that the floating height may vibrate periodically. If writing data in the magnetic disk under this condition, the distance between the magnetic head and the magnetic disk lengthens, a writing magnetic field becomes weak, and consequently, it is difficult to correctly write data in the magnetic disk.

In order to prevent such a write error, for example, Japanese Laid-Open Patent Application No. 9-139040 (hereinafter, referred to as "reference 1") discloses a technique in which variation of the floating height of the magnetic head is monitored by an AGC voltage from an AGC circuit serving as a data reproduction processing circuit for receiving a reproduction signal obtained when the magnetic head reads data from the magnetic disk and for performing data reproduction processing. A CPU compares the input AGC voltage to threshold data DT stored in a memory, and outputs a flying variation detection signal FS indicating the floating height of the magnetic head varies abnormally when the floating height of the magnetic head is outside of a specified range.

In the technique disclosed in reference 1, however, since the floating height variation of the magnetic head is monitored by comparing the reproduction signal to a threshold value, it is difficult to precisely detect the floating height variation of the magnetic head.

Specifically, in the related art, a single threshold value is used to detect the floating height variation of the magnetic head over the entire area of the magnetic disk. For example, as mentioned above, when contamination or a lubricant is present on the surface on the recording medium, local projecting regions exist on the magnetic disk. If the threshold value happens to be set with one of the projecting regions as a reference, it is difficult to obtain correct detection results in other regions of the magnetic disk.

SUMMARY OF THE INVENTION

The present invention may solve one or more of the problems of the related art.

A preferred embodiment of the present invention may provide a disk drive control method, a disk drive, and a write control circuit capable of precise and real-time detection of an abnormal floating height of a magnetic head over an entire area of a magnetic disk.

According to a first aspect of the present invention, there is provided a method of controlling a disk drive, comprising the steps of:

calculating a servo gain difference between a servo gain value obtained from a servo frame of the disk drive and a normal servo gain value recorded in the servo frame, said normal servo gain value being a servo gain value when a magnetic head flies normally relative to a magnetic disk; and forbidding the magnetic head writing data into the magnetic disk when the servo gain difference is equal to or greater than a predetermined value.

Preferably, the normal servo gain value is recorded in the servo frame to be appended to magnetic head position correction data recorded in the servo frame.

According to a second aspect of the present invention, there is provided a method of controlling a disk drive, comprising the steps of:

calculating a reference servo gain value by adding a first servo gain value difference to a servo gain value of a first servo frame immediately preceding a second servo frame corresponding to a writing position, said first servo gain difference being a difference between a first normal servo gain value of the first servo frame and a second normal servo gain value of the second servo frame, said first normal servo gain value being a servo gain value when a magnetic head flies normally relative to a magnetic disk in the first servo frame, said first normal servo gain value being recorded in the first servo frame, said second normal servo gain value being a servo gain value when the magnetic head flies normally relative to the magnetic disk in the second servo frame;

calculating a second servo gain value difference between a servo gain value of the second servo frame and the reference servo gain value; and forbidding the magnetic head writing data into the magnetic disk when the second servo gain difference is equal to or greater than a predetermined value.

According to a third aspect of the present invention, there is provided a method of controlling a disk drive, comprising the steps of:

reading out an average normal servo gain value, said average normal servo gain value being an average servo gain value when a magnetic head flies normally relative to a magnetic disk;

reading out a first servo gain value difference, said first servo gain difference being a difference between the average normal servo gain value and a normal servo gain value of a servo frame corresponding to a writing position, said normal servo gain value being a servo gain value when the magnetic head flies normally relative to the magnetic disk in the servo frame corresponding to the writing position;

calculating a reference servo gain value by summing the first servo gain value difference and the average normal servo gain value;

calculating a second servo gain value difference between the normal servo gain value and the reference servo gain value; and forbidding the magnetic head writing data into the magnetic disk when the second servo gain difference is equal to or greater than a predetermined value.

According to a fourth aspect of the present invention, there is provided a method of controlling a disk drive, comprising the steps of:

storing an average normal servo gain value in a storage device when fabricating the disk drive, said average normal servo gain value being an average servo gain value when a magnetic head flies normally relative to a magnetic disk;

storing a first servo gain value difference of each of a plurality of servo frames in the storage device, said first servo gain difference being a difference between the average normal servo gain value and a normal servo gain value of one of the servo frames, said normal servo gain value being a servo gain value when the magnetic head flies normally relative to the magnetic disk in the one of the servo frames;

reading out, when using the disk drive, the average normal servo gain value, and the first servo gain value difference of one of the servo frames corresponding to a writing position from the storage device;

calculating a reference servo gain value by summing the first servo gain value difference and the average normal servo gain value;

calculating a second servo gain value difference between the reference servo gain value and the normal servo gain value of the servo frame corresponding to the writing position; and forbidding the magnetic head writing data into the magnetic disk when the second servo gain difference is equal to or greater than a predetermined value.

According to a fifth aspect of the present invention, there is provided a disk drive, comprising:

a magnetic disk that includes a plurality of servo frames and a plurality of user data areas;

a magnetic head that, while flying relative to the magnetic disk, writes data into and reads data from the magnetic disk;

a servo gain generation unit that makes correction to servo data read from one of the servo frames to generate a servo gain value;

a normal servo gain value recording unit that records a normal servo gain value in a corresponding one of the servo frames in advance, said normal servo gain value being a servo gain value when the magnetic head flies normally relative to the magnetic disk; and a writing forbidding unit that calculates a servo gain difference between the servo gain value generated by the servo gain generation unit and the normal servo gain value read from the corresponding one of the servo frames, and forbids the magnetic head writing data into the magnetic disk when the servo gain difference is equal to or greater than a predetermined value.

According to a sixth aspect of the present invention, there is provided a disk drive, comprising:

a magnetic disk that includes a plurality of servo frames and a plurality of user data areas;

a magnetic head that, while flying relative to the magnetic disk, writes data into and reads data from the magnetic disk;

a servo gain generation unit that makes correction to servo data read from one of the servo frames to generate a servo gain value;

a difference recording unit that records a first servo gain value difference between a normal servo gain value of an N-th servo frame and a normal servo gain value of an (N+1)-th servo frame in a corresponding servo frame in advance, where N is an integer, said normal servo gain value being a servo gain value when a magnetic head flies normally relative to a magnetic disk in the corresponding servo frame;

a reference servo gain generation unit that, during a writing operation, reads out the first servo gain value difference recorded in the corresponding servo frame associated with one of the user data areas, and adds the first servo gain value difference to a servo gain value of a first servo frame immediately preceding a second servo frame corresponding to a writing position so as to calculate a reference servo gain value;

a writing forbidding unit that calculates a second servo gain difference between the servo gain value generated by the servo gain generation unit and the reference servo gain value from the reference servo gain generation unit, and forbids the magnetic head writing data into the magnetic disk when the servo gain difference is equal to or greater than a predetermined value.

Preferably, the second servo gain difference is recorded in the servo frame to be appended to magnetic head position correction data recorded in the servo frame.

According to a seventh aspect of the present invention, there is provided a disk drive, comprising:

a magnetic disk that includes a plurality of servo frames and a plurality of user data areas;

a magnetic head that, while flying relative to the magnetic disk, writes data into and reads data from the magnetic disk;

a servo gain generation unit that makes correction to servo data read from one of the servo frames to generate a servo gain value;

a storage unit that stores an average normal servo gain value in advance, and stores first servo gain value differences between the average normal servo gain value and normal servo gain values in respective servo frames in advance, said average normal servo gain value being an average servo gain value when the magnetic head flies normally relative to the magnetic disk, each of the normal servo gain values being a servo gain value when the magnetic head flies normally relative to the magnetic disk in the corresponding one of the servo frames;

a reference servo gain generation unit that, during a writing operation, reads out the first servo gain value difference from the corresponding servo frame in correspondence to a writing position, reads out the average normal servo gain value from the storage unit, and calculates a reference servo gain value by summing the first servo gain value difference and the average normal servo gain value, and a writing forbidding unit that calculates a second servo gain difference between the servo gain value generated by the servo gain generation unit and the reference servo gain value from the reference servo gain generation unit, and forbids the magnetic head writing data into the magnetic disk when the servo gain difference is equal to or greater than a predetermined value.

According to an eighth aspect of the present invention, there is provided a write control circuit, comprising:

a comparison unit that compares a servo gain value obtained from a servo frame corresponding to a writing position to a normal servo gain value of the servo frames, said normal servo gain value being measured in advance and being a servo gain value when a magnetic head flies up normally relative to a magnetic disk; and a writing forbidding unit that forbids the magnetic head writing data into the magnetic disk when a difference between the servo gain value and the normal servo gain value is equal to or greater than a predetermined value.

Preferably, the reference servo gain value is the normal servo gain value.

Preferably, the reference servo gain value is obtained by adding a first servo gain value difference to a servo gain value of a first servo frame immediately preceding a second servo frame corresponding to a writing position, said first servo gain difference being a difference between a first normal servo gain value of the first servo frame and a second normal servo gain value of the second servo frame.

According to the present invention, when fabricating the disk drive, normal servo gain values, which are servo gain values when the magnetic head flies normally relative to the magnetic disk, are recorded in corresponding servo frames of the magnetic disk in advance; when writing data into the magnetic disk, a servo gain difference between a servo gain value obtained from the servo frame of the disk drive and the normal servo gain value recorded in the servo frame is calculated, and based on the servo gain difference, the magnetic head is forbid to write data into the magnetic disk. Thus, it is possible to detect abnormal floating heights of the magnetic head based on the normal servo gain values recorded in respective the servo frames. For this reason, it is possible to precisely detect abnormal floating heights of the magnetic head in real-time over the entire area of the magnetic disk, and to effectively prevent incorrect write operations.

These and other objects, features, and advantages of the present invention will become more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

First Embodiment

Figure 1:
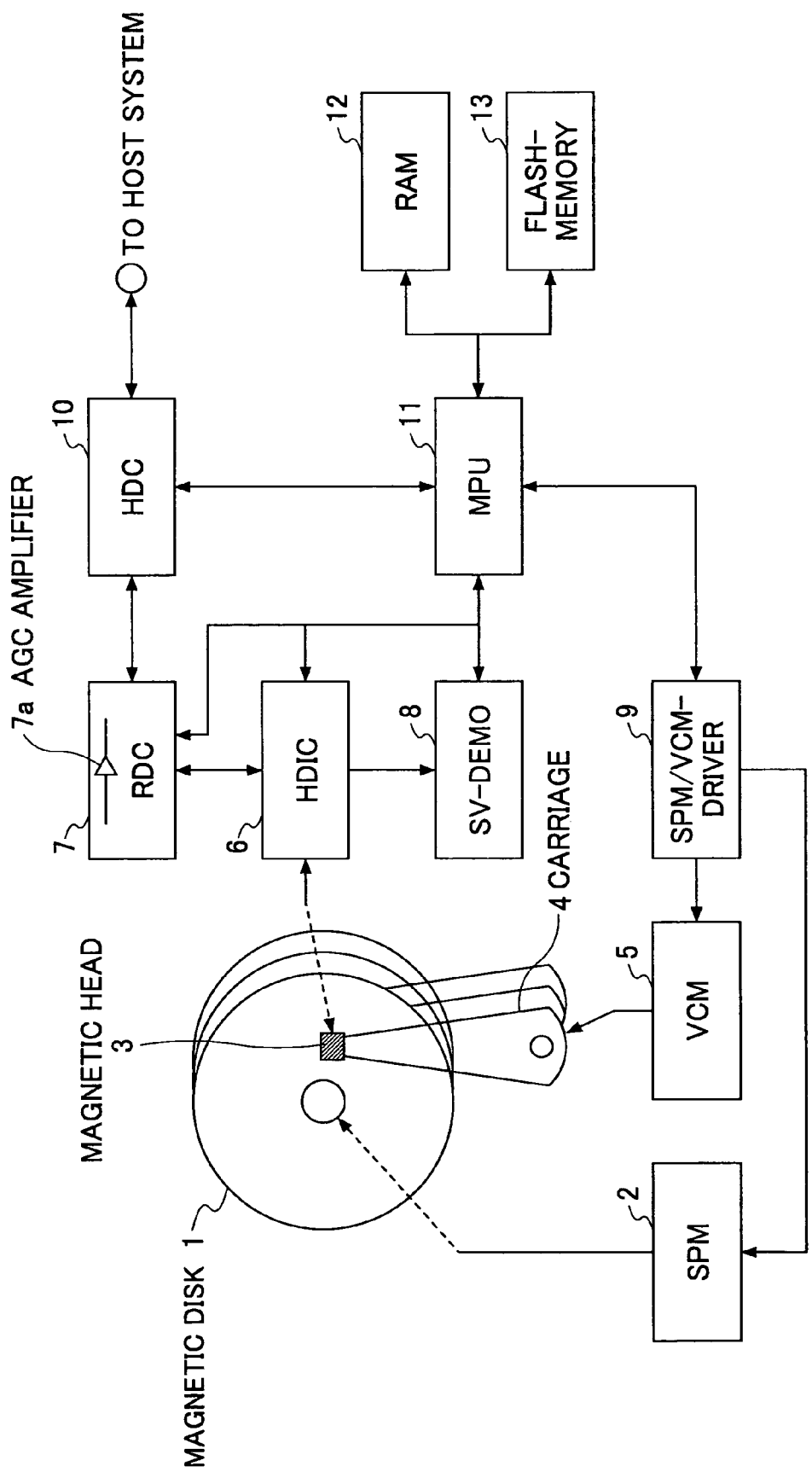
FIG. 1 is a block diagram illustrating a configuration of a magnetic disk storage device according to a first embodiment of the present invention.

FIG. 1 is a block diagram illustrating a configuration of a magnetic disk storage device according to a first embodiment of the present invention.

The magnetic disk storage device in FIG. 1 has a high recording density, and accordingly, the floating height of the magnetic head is relatively small.

As shown in FIG. 1, a magnetic disk 1 is a storage medium which has a magnetic layer on the surface thereof, and data are recorded in the magnetic layer by means of magnetic recording. In the present embodiment, the magnetic disk storage device shown in FIG. 1 may have plural magnetic disks 1. The magnetic disk 1 is driven by a spindle motor 2 (abbreviated as "SPM") to rotate at a specific number of revolutions per minute.

A magnetic head 3 writes data into or reads data from the magnetic disk 1. Usually, two magnetic heads are provided on two sides, respectively, of one magnetic disk. The magnetic head 3 is held by a carridge 4. A VCM (Voice Coil Motor) 5 drives the carridge 4 to move the magnetic head 3 between cylinders (seek operation) provided on the magnetic disk 1.

A HDIC 6 is an IC for controlling operations of the magnetic head 3. When reading data from the magnetic disk 1, the HDIC 6 acts as a preamplifier for amplifying a read signal or a bias power supply of the magnetic head 3; when writing data into the magnetic disk 1, the HDIC 6 acts as a driver of the magnetic head 3; in addition, when there are plural magnetic heads 3, the HDIC 6 functions to select one of the magnetic heads 3 for writing or reading.

A RDC 7 is an IC chip serving as a PRML read channel. When reading data from the magnetic disk 1, the RDC 7 demodulates and decodes signals from the HDIC 6 by using a PRML scheme, and transforms the decoded digital data into parallel signals. When writing data into the magnetic disk 1, the RDC 7 encodes the data to be written, and transmits the thus obtained analog signals to the HDIC 6.

The RDC 7 includes an AGC (Auto Gain Control) amplifier 7a which adjusts the signal sent from the HDIC 6 to a preset amplitude before demodulating and decoding the signal from the HDIC 6 in reading operations.

A SV-DEMO 8 is an IC chip acting as a servo demodulator for signal processing in order to perform servo control to adjust the position of the magnetic head 3.

A SPM/VCM-DRIVER 9 is an IC chip for controlling the power supplied to the SPM 2 and the VCM 5 in accordance with a control signal sent from the SV-DEMO 8 via a MPU 11, so as to control the rotational motion of the magnetic disk 1 and the translational motion of the carridge 4.

A HDC 10 is an IC chip acting as a hard disk controller, which receives and transmits various instructions and data between host systems such as host computers of the magnetic disk drive, and receives requests for operations of the magnetic disk drive.

The MPU 11 is a micro-processor for controlling operations of the whole magnetic disk drive.

A RAM 12 is a random access memory that serves as a working memory of the MPU 11 when the MPU 11 executes control operations.

A FLASH-MEMORY 13 is a flash EEPROM for storing control programs executed by the MPU 11 and various data used for detecting a floating height of the magnetic head 3.

Figure 2:
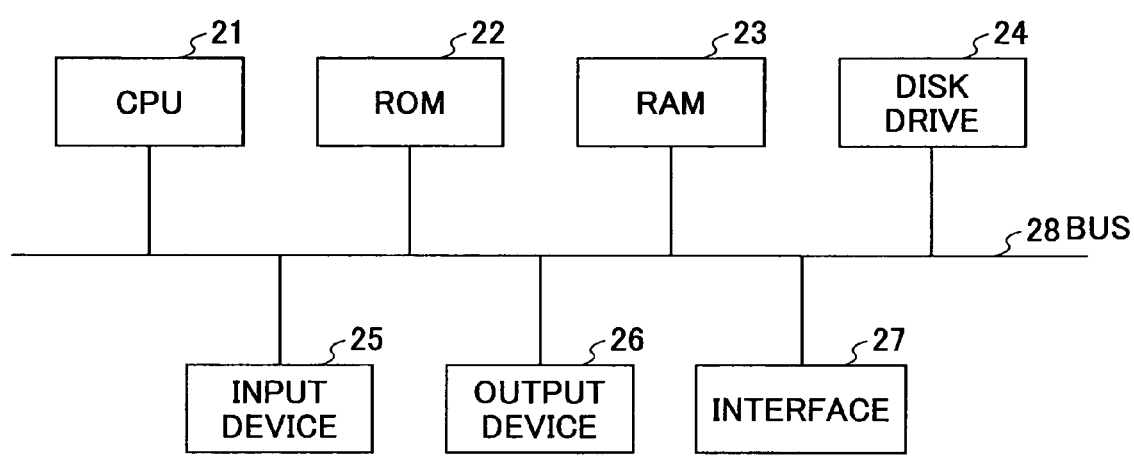
FIG. 2 is a block diagram illustrating a configuration of a host system in which a magnetic disk drive 24 is installed.

FIG. 2 is a block diagram illustrating a configuration of a host system in which a magnetic disk drive 24 is installed.

As shown in FIG. 2, a CPU 21, a ROM 22, a RAM 23, the magnetic disk drive 24, an input device 25, an output device 26, and an interface 27 are connected to a bus 28, and the CPU 21 controls the other components to exchange data with each other.

The CPU 21 is the central processor for controlling the overall operations of the host system. The ROM 22 is a memory for storing control programs executed by the CPU 21. The CPU 21 executes the control programs to control the overall operations of the host system.

The RAM 23 is the area used for storing various temporary data, and is used as a working memory when the CPU 21 executes the control programs in the ROM 22.

The magnetic disk drive 24 has the configuration as shown in FIG. 1.

The input device 25 may be a keyboard or a mouse operated by a user of the host system, and obtains operations information of the key board or the mouse.

The output device 26 may be a CRT or other displays for performing output operations directed by the CPU 21.

The interface 27 manages data exchange among apparatuses connected directly to the host system, or apparatuses connected indirectly to the host system via a network.

Below, the format of the magnetic disk 1 is explained.

Figure 3:
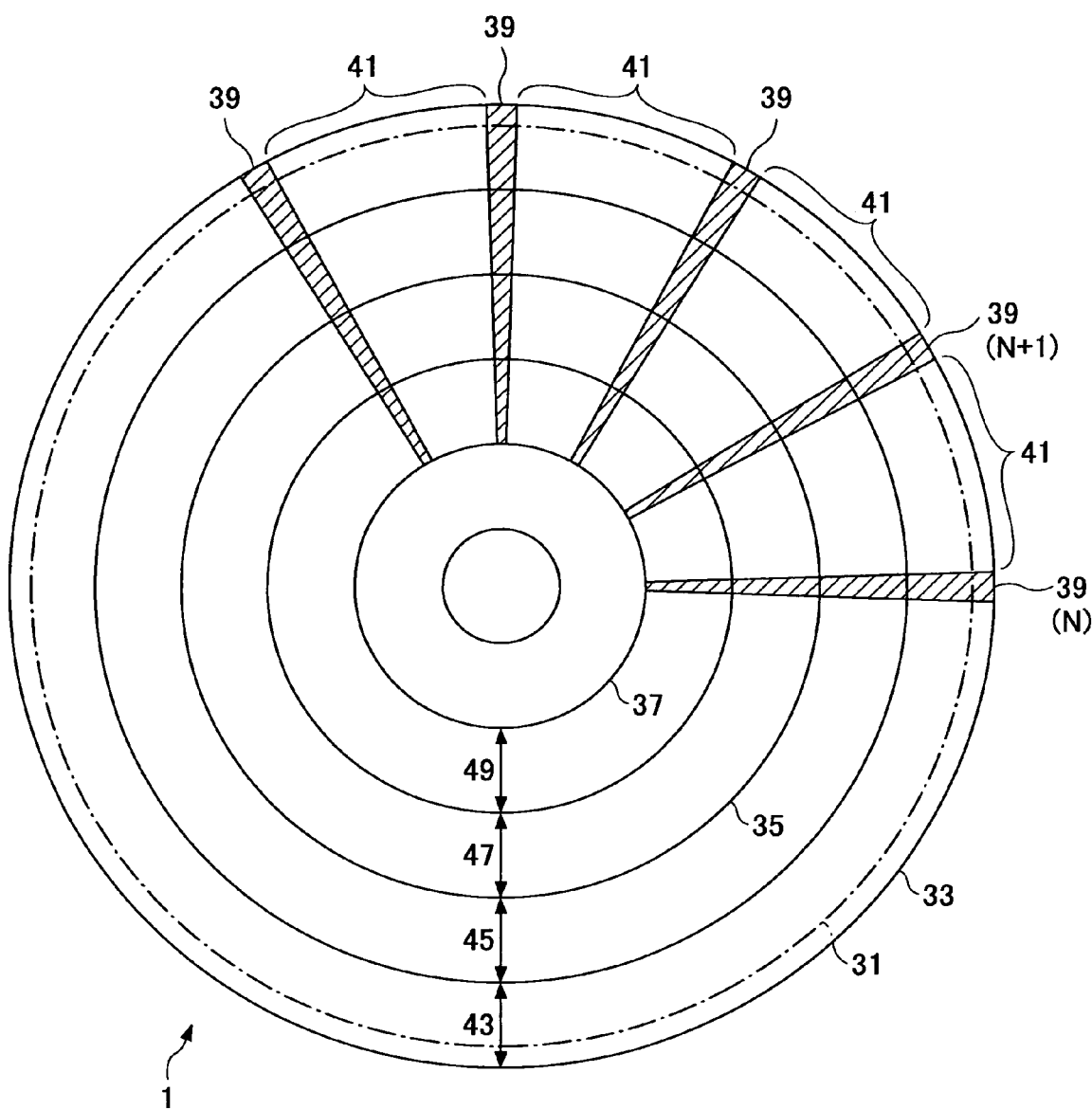
FIG. 3 is a schematic view illustrating the format of a recording surface of the magnetic disk 1.

FIG. 3 is a schematic view illustrating the format of a recording surface of the magnetic disk 1.

The magnetic disk 1 may have plural recording surfaces, and the recording surfaces have the same format.

As shown in FIG. 3, on the recording surface of the magnetic disk 1, there are a large number of concentric tracks 31. Among the tracks 31, there is an outermost track located in the most peripheral position 33 of the magnetic disk 1 in the radial direction, there is an innermost track located in the innermost position 37 of the magnetic disk 1, and there are intermediate tracks located in intermediate positions 35.

The magnetic head 3 and the slider holding the magnetic head 3 can move in radial directions relative to the recording surfaces of the magnetic disk 1. When the magnetic head 3 is located over a specific track, a track segment of the specific track and corresponding track segments on other recording surfaces are called a "cylinder".

On each of the recording surfaces of the magnetic head 3, plural servo frames 39 are arranged at regular intervals running in a radial manner from the innermost track to the outermost track. In FIG. 3, only part of the servo frames 39 are illustrated; actually the servo frames 39 are arranged discretely all over the magnetic disk 1 in a circumferential direction at regular angular intervals, and servo data are recorded in the servo frames 39. Between two adjacent servo frames 39, there is a data area 41 for storing user data and system data. The servo data, user data and system data are recorded along the tracks.

In the magnetic disk drive 24, the tracks are segmented into segments having the same length, which is the so called "sector format". There are plural sectors in the data area 41. The sector is the unit of recording or reproducing data in the magnetic disk 1, and it is also the unit of data transfer between the magnetic disk drive 24 and the CPU 21. In the present embodiment, the sectors are grouped into four zones 43, 45, 47 and 49 in the radial direction. It should be noted that it is not necessary that each of the zones 43, 45, 47 and 49 include nearly the same number of the tracks; in addition, the number of the zones is not limited to four.

Figure 4A:
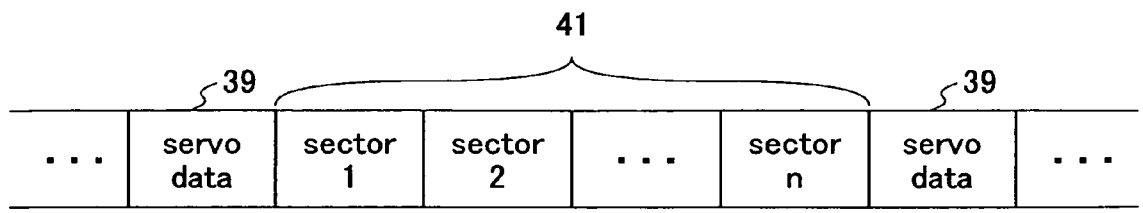
FIG. 4A through FIG. 4C are diagrams illustrating details of the format of the servo frame 39 and the data area 41.
Figure 4B:
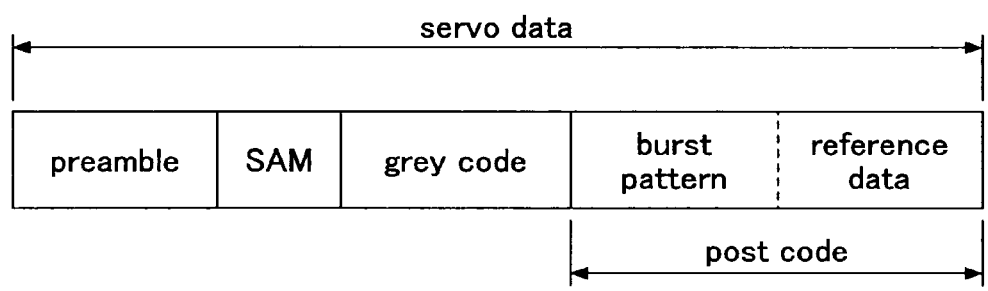
Figure 4C:
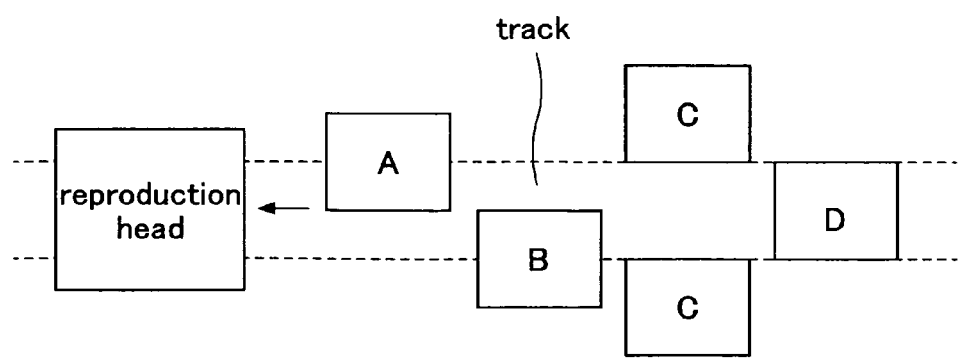

FIG. 4A through FIG. 4C are diagrams illustrating details of the format of the servo frame 39 and the data area 41.

As shown in FIG. 4A, servo data are recorded in the servo frames 39, and the servo frames 39 are separated by plural sectors in the data area 41.

As shown in FIG. 4B, the servo data include a preamble pattern at the header, and a servo address mark (SAM), a grey code, and a burst pattern arranged sequentially. Further, in the present embodiment, reference data (described in detail below) are recorded after the above data. The grey code and the burst pattern are referred to as "head position information". In the present embodiment, the reference data are appended to the head position information.

The preamble is a continuous pattern, which is used to perform PLL (Phase Lock Loop) to achieve synchronization with the system clock of the magnetic disk drive 24, the grey code, and the burst pattern. In addition, the preamble is also used to adjust the gain of a VGA for amplifying a reproduction output of the grey code and the burst pattern.

The SAM is a dedicated pattern without other usage. When the SAM is detected, a servo interrupt signal is generated, and is sent to the CPU 21; upon that, the HDIC 10 enters into a servo control state. When the SAM is detected, further, a servo gate signal is generated, which is used to control the timing of reading the grey code and the burst pattern. In order to determine whether it is permitted to read the SAM, a time window is defined, and when reading of the SAM fails within a preset time period, a servo error is sent to the CPU 21.

The grey code includes descriptions of cylinder numbers of the cylinders, or track numbers by using grey codes. Sometimes, sector numbers of the data area 41 are also recorded. The grey codes are different from usual binary codes; specifically, it is defined that one bit of the bit pattern changes each time the value is incremented by one. With this pattern, during seek control, even when the magnetic head 3 moves between the track n and the track n+1, values of either of the tracks can be obtained.

The burst pattern is used for track following processing, in which a precise position of the magnetic head 3 relative to an object track is detected, and the magnetic head 3 is positioned at the center of the object track.

FIG. 4C illustrates details of the burst pattern.

As shown in FIG. 4C, the burst pattern includes four portions A, B, C, D, each of which portions has a width equaling a traffic pitch (with two tracks as a cycle). The four portions A, B, C, D are shifted relative to each other by half of the traffic pitch in the radial direction.

The reference data are used to detect abnormal flying of the magnetic head 3 relative to the magnetic disk 1. The reference data are recorded to be appended to the head position information including the grey code and the burst pattern when a servo track writer (STW) is used to write servo data into the servo frames 39 of the magnetic disk 1.

The control process of the magnetic disk drive 24 performed by the MPU in the magnetic disk drive 24 is described in the following embodiments of the present invention.

Second Embodiment

In the present embodiment and the following embodiments, the floating height of the magnetic head 3 relative to the magnetic disk 1 is detected, and when an abnormal floating height is detected, the magnetic head is forbidden to write data into the magnetic disk 1. In addition, in the control process of the magnetic disk drive 24, control programs stored in the FLASH-MEMORY 13 beforehand are read into the MPU 11 and are executed by the MPU 11 to perform the control process of the magnetic disk drive 24.

Figure 5A:
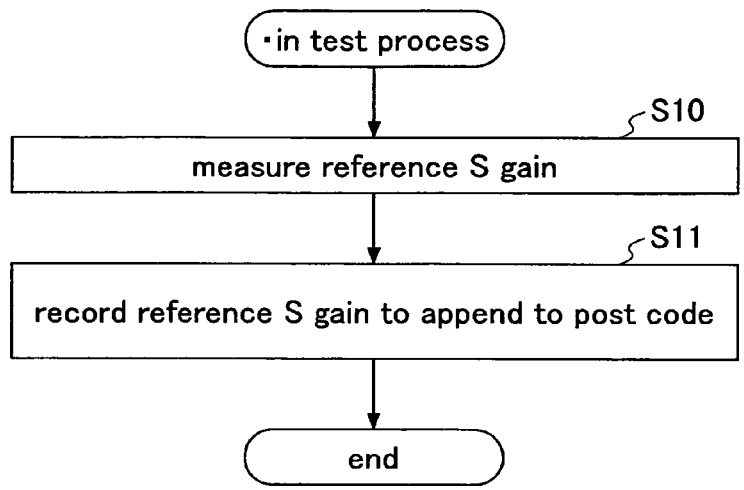
FIG. 5A and FIG. 5B are flowcharts illustrating the control process of the magnetic disk drive 24 according to a second embodiment of the present invention.
Figure 5B:
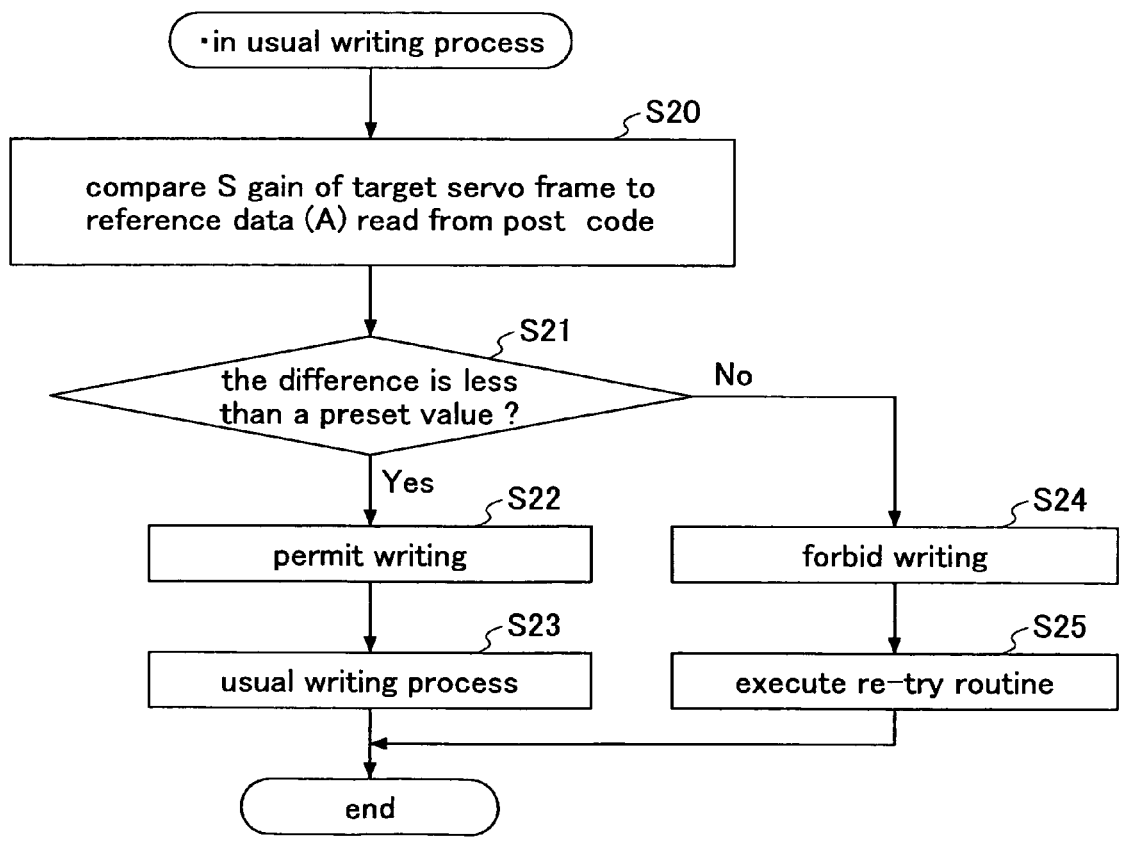

FIG. 5A and FIG. 5B are flowcharts illustrating the control process of the magnetic disk drive 24 according to a second embodiment of the present invention.

FIG. 5A shows a test process executed when fabricating the disk drive 24. In the present embodiment, it is assumed that the servo data are recorded beforehand in the servo frames 39 of the magnetic disk 1 with STW by well known methods prior to the test process as shown in FIG. 5A.

The process in FIG. 5A is initiated when the CPU 21 outputs a control start signal to the MPU 11.

In step S10, the MPU 11 reads out the servo data recorded in the servo frames 39. Specifically, the MPU 11 drives the SPM/VCM-DRIVER 9, the SPM 2, and the VCM 5 to drive the magnetic head 3 to read out the servo data recorded in the servo frames 39. The servo data are sent to the RDC 7 via the HDIC 6. Depending on the strength of signals of the servo data, the value of the servo-gain of the AGC (Auto Gain Control) amplifier 7a of the RDC 7 is adjusted (below, the thus adjusted servo-gain is referred to as "S-gain").

The S-gain is measured separately in each servo frame 39 in the magnetic disk 1. The thus obtained S-gain is in correlation with the distance between the magnetic disk 1 and the magnetic head 3. Namely, when the magnetic disk 1 and the magnetic head 3 are far apart from each other, the servo data (signal) read and output by the magnetic head 3 is weak, and accordingly, the S-gain rises; whereas, when the magnetic disk 1 and the magnetic head 3 are close to each other, the servo data (signal) read and output by the magnetic head 3 is strong, and accordingly, the S-gain is lowered. Thus, the floating height of the magnetic head 3 relative to the magnetic disk 1 can be obtained from the S-gain.

Because at the time when the disk drive 24 is fabricated before shipment there is little contamination or lubricant on the surface on the magnetic disk 1, the surface on the magnetic disk 1 is nearly uniform. For this reason, the S-gain measured when the disk drive 24 is fabricated can be regarded as a value when the magnetic head 3 flies normally relative to the magnetic disk 1.

In the present embodiment, the S-gain measured when the disk drive 24 is fabricated is used as a reference value indicating a reference state of the magnetic disk 1. The S-gain used as a reference value is measured for all servo frames 39. The thus obtained S-gains are temporarily stored in the RAM 12.

In step S11, the thus obtained reference S-gain is written in the post code of the corresponding servo frame 39. Specifically, the MPU 11 reads out, from the RAM 12, the S-gain corresponding to the servo frame 39 to which the MPU 11 is to write data, and writes the reference S-gain in the servo frame 39 via the HDIC 6 and the magnetic head 3. In the process, for example, the S-gain is written at a position subsequent to the burst pattern in the post code, in other words, the S-gain is appended to the burst pattern.

With the processing as shown in FIG. 5A, for example, before shipment of the disk drive 24, in the factory, the reference S-gains are written in the servo frames 39 of the magnetic disk 1. After that, the disk drive 24 is shipped with the reference S-gains having been written in the servo frames 39.

FIG. 5B is a flowchart illustrating the control process of the magnetic disk drive 24 according to the present embodiment, in which the disk drive 24 with the S-gains as reference values having been written in the servo frames 39 is installed in a personal computer for use.

In step S20, the CPU 21 directs the MPU 11 to read the servo data written in an object servo frame 39 corresponding to the data area 41, into which data are to be written. Hence, the MPU 11 drives the SPM 2 and the VCM 5 to drive the magnetic head 3 to read out the servo data recorded in the servo frame 39. The servo data are sent to the RDC 7 via the HDIC 6. Depending on the strength of signals of the servo data, the servo-gain of the AGC (Auto Gain Control) amplifier 7a of the RDC 7 is adjusted (blow, the thus adjusted servo-gain is referred to as "S-gain (R)").

As described above, the reference S-gain is written in the post code of the servo data when fabricating the disk drive 24. Since the post code is definitely read when reading the servo data, the reference S-gain written in the post code is definitely read out when reading the post code. In the present embodiment, the thus read reference S-gain is directly used for determining the floating height of the magnetic head 3.

After the reference S-gain and the servo-gain S-gain (R) are obtained, next, the reference S-gain and the servo-gain S-gain (R) are compared with each other, and the difference between them is calculated.

In step S21, it is determined whether the difference between the reference S-gain and the servo-gain S-gain (R) is less than a preset value.

If the difference between the reference S-gain and the servo-gain S-gain (R) is less than the preset value, the routine proceeds to step S22; otherwise, the routine proceeds to step S24.

When the difference between the reference S-gain and the servo-gain S-gain (R) is less than the preset value, it is thought that the servo-gain S-gain (R) of the servo frame 39 corresponding to the data area 41, into which data are to be written, is close to the S-gain, and the magnetic head 3 is in a normal flying state.

In step S22, since the difference between the reference S-gain and the servo-gain S-gain (R) is less than the preset value, that is, the magnetic head 3 is in a normal flying state, writing operations are allowed.

In step S23, a usual writing process is performed. In the usual writing process, since the magnetic head 3 is in the normal flying state, reliable write operations can be performed without write errors.

In step S24, since the difference between the reference S-gain and the servo-gain S-gain (R) is not less than the preset value, that is, the magnetic head 3 is not in the normal flying state, the writing operations are forbidden.

In step S25, since it is not certain that the writing operations cannot be performed appropriately, a re-try routine is executed to try the writing operations again.

The above series of control processes are executed when reading all the servo frames 39 (namely, when writing data to the data area 41). Thus, in all areas on the magnetic disk 1, it is possible to accurately detect abnormal flying of the magnetic head 3 in real-time, and to effectively prevent incorrect writing operations.

Third Embodiment

Figure 6A:
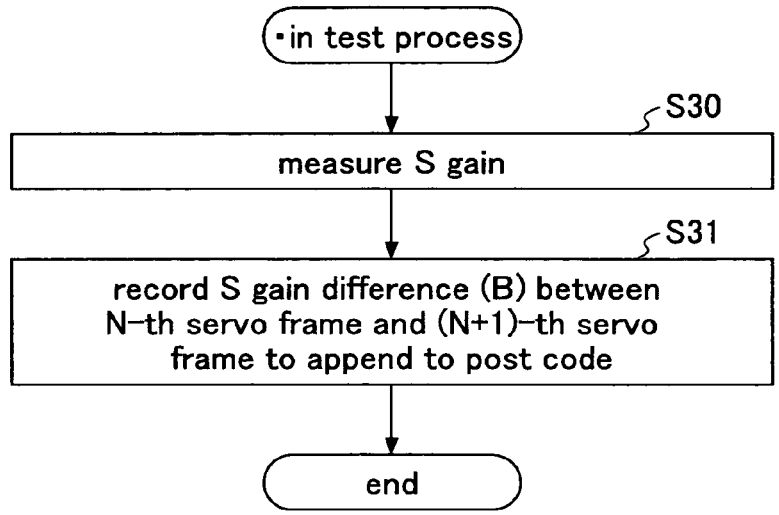
FIG. 6A and FIG. 6B are flowcharts illustrating the control process of the magnetic disk drive 24 according to a third embodiment of the present invention.
Figure 6B:
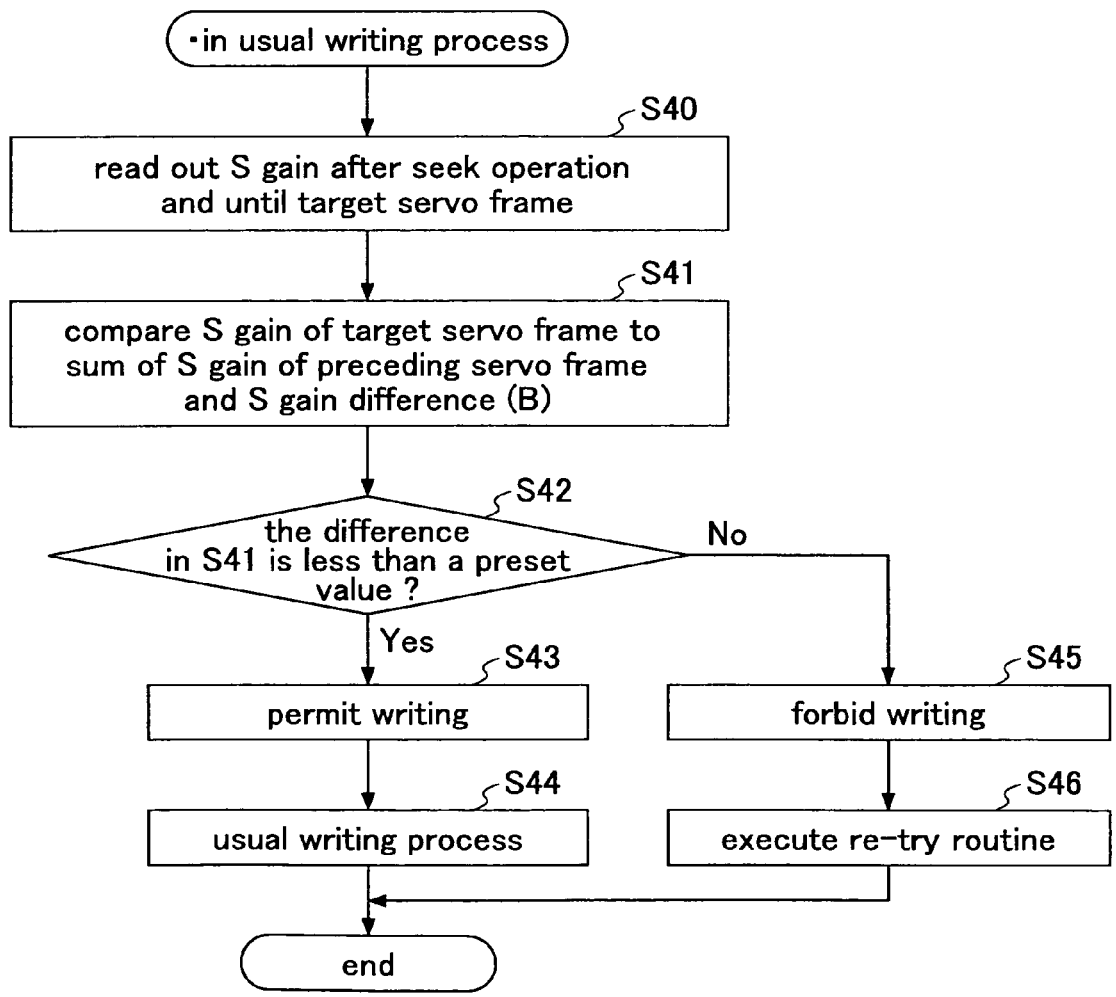

FIG. 6A and FIG. 6B are flowcharts illustrating the control process of the magnetic disk drive 24 according to a third embodiment of the present invention.

FIG. 6A shows a test process executed when fabricating the disk drive 24. In the present embodiment, it is assumed that the servo data are recorded in the servo frames 39 of the magnetic disk 1 prior to the test process as shown in FIG. 6A.

The process in FIG. 6A is initiated when the CPU 21 outputs a control start signal to the MPU 11.

In step S30, the MPU 11 reads out the servo data recorded in the servo frames 39. Specifically, the MPU 11 drives the SPM/VCM-DRIVER 9, the SPM 2, and the VCM 5 to drive the magnetic head 3 to read out the servo data recorded in the servo frames 39. The servo data are sent to the RDC 7 via the HDIC 6. Depending on the strength of signals of the servo data, the value of the servo-gain of the AGC (Auto Gain Control) amplifier 7a of the RDC 7 is adjusted (below, the thus adjusted servo-gain is referred to as "S-gain").

The S-gain is measured separately in each servo frame 39 in the magnetic disk 1. The thus obtained S-gain is in correlation with the distance between the magnetic disk 1 and the magnetic head 3. Namely, when the magnetic disk 1 and the magnetic head 3 are far apart from each other, the servo data (signal) read and output by the magnetic head 3 is weak, and accordingly, the S-gain rises; whereas, when the magnetic disk 1 and the magnetic head 3 are close to each other, the servo data (signal) read and output by the magnetic head 3 is strong, and accordingly, the S-gain lowers. Thus, the floating height of the magnetic head 3 relative to the magnetic disk 1 can be obtained from the S-gain.

As described above, because at the time when the disk drive 24 is fabricated before shipment there is little contamination or lubricant on the surface on the magnetic disk 1, the surface on the magnetic disk 1 is nearly uniform. For this reason, the S-gain measured when the disk drive 24 is being fabricated can be regarded as a value when the magnetic head 3 flies normally relative to the magnetic disk 1.

In step S31, among plural servo frames 39 (assume there are n servo frames 39), a difference (B) between an S-gain (N) of the N-th servo frame 39 and an S-gain (N+1) of the (N+1)-th servo frame 39 is calculated, where N is an integer from 1 through (n−1). The thus obtained differences (B) are temporarily stored in the RAM 12.

Then, the MPU 11 writes the thus obtained differences (B) in the post code of the respective servo frames 39. Specifically, the MPU 11 reads out, from the RAM 12, the difference (B) corresponding to the servo frame 39 to which the MPU 11 is to write data, and writes the difference (B) as a reference data item in the servo frame 39 via the HDIC 6 and the magnetic head 3. In the process, for example, the reference data item is written at a position subsequent to the burst pattern in the post code, in other words, the S-gain is appended to the burst pattern.

With the processing as shown in FIG. 6A, for example, before shipment of the disk drive 24, in the factory, the differences (B) of S-gains of adjacent servo frames 39 are recorded in the servo frames 39 of the magnetic disk 1 as reference data. After that, the disk drive 24 is shipped with the S-gain differences (B) having been recorded in the servo frame 39 as reference data.

FIG. 6B is a flowchart illustrating the control process of the magnetic disk drive 24 according to the present embodiment, in which the disk drive 24 with the S-gain differences (B) as reference data having been recorded in the servo frames 39 is installed in a personal computer for use.

In step S40, when the MPU 11 receives directions from the CPU 21 to write data into the magnetic disk 1, the MPU 11 reads out the S-gains in the respective servo frames 39 from the position after the seek operation of the preceding writing operation is completed to the data area 41 into which data are to be written (below, referred to a "target data area"). The thus obtained S-gains are temporarily stored in the RAM 12.

In step S41, the MPU 11 reads out the S-gain (M−1) of the (M−1)-th servo frame 39, which immediately precedes the servo frame 39 of the target data area (assume the servo frame 39 of the target data area is the M-th servo frame 39): then the MPU 11 reads out, from the RAM 12, the S-gain difference (B) recorded in the servo frame 39 corresponding to the target data area; and then, the MPU 11 sums the S-gain (M−1) and the S-gain difference (B), and uses the resulting value as a reference value (namely, the reference value=S-gain (M−1)+B).

Further, the CPU 21 directs the MPU 11 to read the servo data written in the servo frame 39 corresponding to the target data area 41, into which data are to be written. In response, the MPU 11 drives the SPM 2 and the VCM 5 to drive the magnetic head 3 to read out the servo data recorded in the servo frame 39. The servo data are sent to the RDC 7 via the HDIC 6. Depending on the strength of signals of the servo data, the servo-gain S-gain (R) of the AGC (Auto Gain Control) amplifier 7a of the RDC 7 is adjusted.

Then, the MPU 11 compares the reference value (S-gain (M−1)+B) to the S-gain (R). Namely, the MPU 11 calculates the difference between the reference value (S-gain (M−1)+B) and the S-gain (R).

In step S42, it is determined whether the difference between the reference S-gain and the servo-gain S-gain (R) is less than a preset value.

The step S42 through step S46 are the same as the step S21 through step S25 shown in FIG. 5B, and the overlapping descriptions are omitted.

The above series of control processes are executed when reading all the servo frames 39 (namely, when writing data to the data area 41). As a result, it is possible to accurately detect abnormal flying of the magnetic head 3 in real-time, and to effectively prevent incorrect writing operations in all areas on the magnetic disk 1.

Further, in the present embodiment, instead of recording the S-gain in the post code as the reference value, the difference (B) between the S-gain (N) of the N-th servo frame 39 and the S-gain (N+1) of the (N+1)-th servo frame 39 is recorded in the post code, and thus, the number of bits of the recorded data is small, and this reduces unnecessary usage of the data area 41.

Fourth Embodiment

Figure 7A:
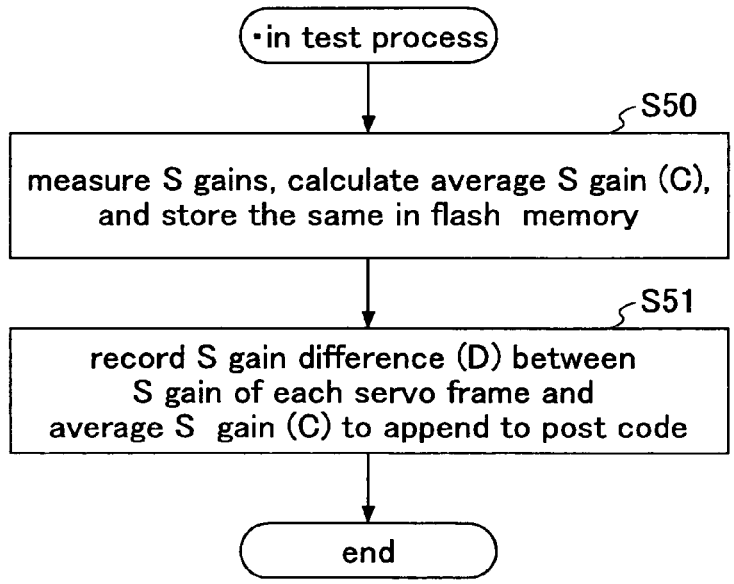
FIG. 7A and FIG. 7B are flowcharts illustrating the control process of the magnetic disk drive 24 according to a fourth embodiment of the present invention.
Figure 7B:
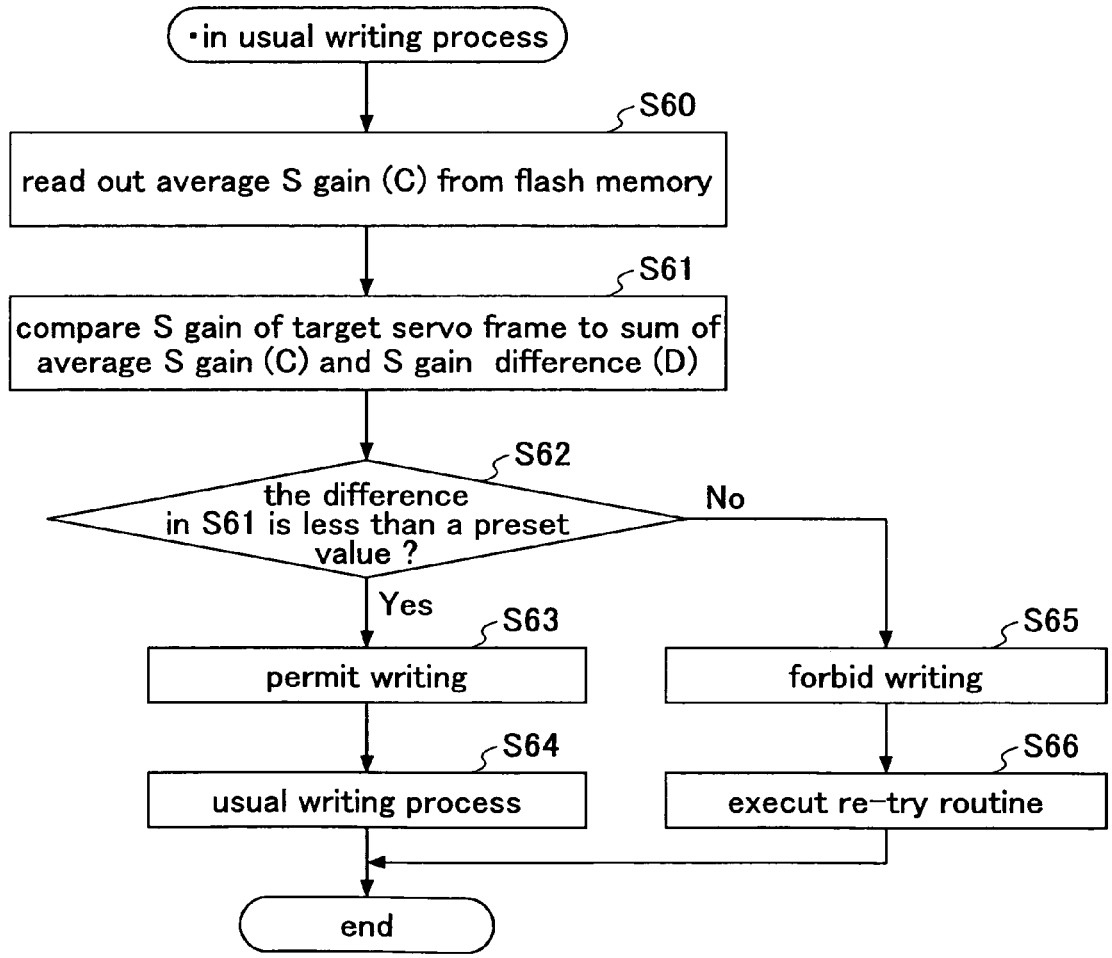

FIG. 7A and FIG. 7B are flowcharts illustrating the control process of the magnetic disk drive 24 according to a fourth embodiment of the present invention.

FIG. 7A shows a test process executed when fabricating the disk drive 24. In the present embodiment, it is assumed that the servo data are recorded in the servo frames 39 of the magnetic disk 1 prior to the test process as shown in FIG. 7A.

The process in FIG. 7A is initiated when the CPU 21 outputs a control start signal to the MPU 11.

In step S50, the MPU 11 reads out the servo data recorded in the servo frames 39. Specifically, the MPU 11 drives the SPM/VCM-DRIVER 9, the SPM 2, and the VCM 5 to drive the magnetic head 3 to read out the servo data recorded in the servo frames 39. The servo data are sent to the RDC 7 via the HDIC 6.

The S-gain is measured separately in each of the servo frames 39 in the magnetic disk 1. The thus obtained S-gain is in correlation with the distance between the magnetic disk 1 and the magnetic head 3.

At the time when the disk drive 24 is fabricated before shipment, because there is little contamination or lubricant on the surface on the magnetic disk 1, the surface on the magnetic disk 1 is nearly uniform. For this reason, the S-gain measured when the disk drive 24 is being fabricated can be regarded as a value when the magnetic head 3 flies normally relative to the magnetic disk 1.

In the present embodiment, the average value C of the thus obtained S-gains over all of the servo frames 39 is calculated. The average value C of the S-gains may be calculated in the following ways. For example, the average values C1, C2, C3, C4 of the S-gains of the grouped zones 43, 45, 47, 49 can be calculated separately. Alternatively, the average values C1 through CX of the S-gains associated with plural magnetic heads 3 (assume there are X magnetic heads 3) can be calculated separately. The thus obtained average value C is temporarily stored in the FLASH-MEMORY 13.

In step S51, differences (D) between S-gains of all the servo frames 39 obtained above and the average value C obtained above are calculated. If the average values C1, C2, C3, C4 of the S-gains are calculated in the respective grouped zones 43, 45, 47, 49, differences (D1 through D4) between the S-gains of the servo frames 39 in the corresponding zones and the average values C1, C2, C3, C4 of the corresponding zones are calculated, respectively. Alternatively, if the average values C1 through CX of the S-gains associated with plural magnetic heads 3 are calculated separately, differences (D1 through DX) between the S-gains of the servo frames 39 and the average values C1 through CX are calculated, respectively. The thus obtained average values C are temporarily stored in the RAM 12.

Below, for simplicity of description, the average values C1 through C4 of the S-gains calculated in the respective grouped zones 43, 45, 47, 49, and the average values C1 through CX of the S-gains calculated associated with X magnetic heads 3 are collectively referred to as "the average values C", and the differences (D1 through D4) and the differences (D1 through DX) between the S-gains of the servo frames 39 and the average value C are collectively referred to as "differences D between the S-gains and the average value C".

Then, the MPU 11 writes the thus obtained differences (D) in the post code of the respective servo frames 39. Specifically, the MPU 11 reads out, from the RAM 12, the difference (D) corresponding to the servo frame 39 to which the MPU 11 is to write data, and writes the difference (D) as a reference data item in the servo frame 39 via the HDIC 6 and the magnetic head 3. In the process, for example, the reference data item is written at a position subsequent to the burst pattern in the post code, in other words, the S-gain is appended to the burst pattern.

With the processing as shown in FIG. 7A, for example, before shipment of the disk drive 24, in the factory, the differences (D) of the S-gains of the servo frames 39 are recorded in the servo frames 39 of the magnetic disk 1 as reference data. After that, the disk drive 24 is shipped with the S-gain differences (D) having been recorded in the servo frame 39 as reference data.

FIG. 7B is a flowchart illustrating the control process of the magnetic disk drive 24 according to the present embodiment, in which the disk drive 24 with the S-gain differences (D) as reference data having been recorded in the servo frames 39 is installed in a personal computer for use.

In step S60, when the MPU 11 receives directions from the CPU 21 to write data into the magnetic disk 1, the MPU 11 reads out the average value C from the FLASH-MEMORY 13.

In step S60, the CPU 21 directs the MPU 11 to read the servo data written in the servo frame 39 corresponding to the target data area 41, into which data are to be written.

In response, the MPU 11 drives the SPM 2 and the VCM 5 to drive the magnetic head 3 to read out the servo data recorded in the servo frame 39. The servo data are sent to the RDC 7 via the HDIC 6. Depending on the strength of signals of the servo data, the servo-gain S-gain (R) of the AGC (Auto Gain Control) amplifier 7a of the RDC 7 is adjusted.

In the present embodiment, the differences (D) between the S-gains of the servo frames 39 and the average S-gain are recorded in the post code when fabricating the magnetic disk drive 24. Since the post code is definitely read when reading the servo data, the differences (D) as the reference value written in the post code are definitely read out when reading the servo data.

In step S61, the MPU 11 reads out the average value C of the S-gains and the difference (D), and then, the MPU 11 sums the average value C and the difference (D), and uses the resulting value (C+D) as the reference value (namely, the reference value=C+D).

Further, the MPU 11 compares the reference value (C+D) to the S-gain (R). Namely, the MPU 11 calculates the difference between the reference value (C+D) and the S-gain (R).

In step S62, it is determined whether the difference between the reference value (C+D) and the servo-gain S-gain (R) is less than a preset value.

The step S62 through step S66 are the same as the step S21 through step S25 shown in FIG. 5B, and the overlapping descriptions are omitted.

The above series of control processes are executed when reading all the servo frames 39 (namely, when writing data to the data area 41). As a result, it is possible to accurately detect abnormal flying of the magnetic head 3 in real-time, and to effectively prevent incorrect writing operations in all areas on the magnetic disk 1.

Further, in the present embodiment, instead of recording the S-gains in the post code as the reference value, the differences (D) between the S-gains and the average value (C) are recorded in the post code; hence the number of bits of the recorded data is small, and this reduces unnecessary usage of the data area 41.

While the invention has been described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2006-075005 filed on Mar. 17, 2006, the entire contents of which are hereby incorporated by reference.

What is claimed is:

1. A method of controlling a disk drive, comprising the steps of:

calculating a servo gain difference between a servo gain value obtained from a servo frame of the disk drive and a normal servo gain value recorded in the servo frame, said normal servo gain value being a servo gain value when a magnetic head flies normally relative to a magnetic disk; and forbidding the magnetic head writing data into the magnetic disk when the servo gain difference is equal to or greater than a predetermined value.

2. The method as claimed in claim 1, wherein the normal servo gain value is recorded in the servo frame to be appended to magnetic head position correction data recorded in the servo frame.

3. A method of controlling a disk drive, comprising the steps of:
   calculating a reference servo gain value by adding a first servo gain value difference to a servo gain value of a first servo frame immediately preceding a second servo frame corresponding to a writing position, said first servo gain value difference being a difference between a first normal servo gain value of the first servo frame and a second normal servo gain value of the second servo frame, said first normal servo gain value being a servo gain value when a magnetic head flies normally relative to a magnetic disk in the first servo frame, said first normal servo gain value being recorded in the first servo frame, said second normal servo gain value being a servo gain value when the magnetic head flies normally relative to the magnetic disk in the second servo frame;
   calculating a second servo gain value difference between a servo gain value of the second servo frame and the reference servo gain value; and
   forbidding the magnetic head writing data into the magnetic disk when the second servo gain value difference is equal to or greater than a predetermined value.

4. A method of controlling a disk drive, comprising the steps of:
   reading out an average normal servo gain value, said average normal servo gain value being an average servo gain value when a magnetic head flies normally relative to a magnetic disk;
   reading out a first servo gain value difference, said first servo gain value difference being a difference between the average normal servo gain value and a normal servo gain value of a servo frame corresponding to a writing position, said normal servo gain value being a servo gain value when the magnetic head flies normally relative to the magnetic disk in the servo frame corresponding to the writing position;
   calculating a reference servo gain value by summing the first servo gain value difference and the average normal servo gain value;
   calculating a second servo gain value difference between the normal servo gain value and the reference servo gain value; and
   forbidding the magnetic head writing data into the magnetic disk when the second servo gain value difference is equal to or greater than a predetermined value.

5. A method of controlling a disk drive, comprising the steps of:
   storing an average normal servo gain value in a storage device when fabricating the disk drive, said average normal servo gain value being an average servo gain value when a magnetic head flies normally relative to a magnetic disk;
   storing a first servo gain value difference of each of a plurality of servo frames in the storage device, said first servo gain value difference being a difference between the average normal servo gain value and a normal servo gain value of one of the servo frames, said normal servo gain value being a servo gain value when the magnetic head flies normally relative to the magnetic disk in the one of the servo frames;
   reading out, when using the disk drive, the average normal servo gain value, and the first servo gain value difference of one of the servo frames, corresponding to a writing position, from the storage device;
   calculating a reference servo gain value by summing the first servo gain value difference and the average normal servo gain value;
   calculating a second servo gain value difference between the reference servo gain value and the normal servo gain value of the servo frame corresponding to the writing position; and
   forbidding the magnetic head writing data into the magnetic disk when the second servo gain value difference is equal to or greater than a predetermined value.

6. A disk drive, comprising:
   a magnetic disk that includes a plurality of servo frames and a plurality of user data areas;
   a magnetic head that, while flying relative to the magnetic disk, writes data into and reads data from the magnetic disk;
   a servo gain generation unit that makes correction to servo data read from one of the servo frames to generate a servo gain value;
   a normal servo gain value recording unit that records a normal servo gain value in a corresponding one of the servo frames in advance, said normal servo gain value being a servo gain value when the magnetic head flies normally relative to the magnetic disk; and
   a writing forbidding unit that calculates a servo gain difference between the servo gain value generated by the servo gain generation unit and the normal servo gain value read from the corresponding one of the servo frames, and forbids the magnetic head writing data into the magnetic disk when the servo gain difference is equal to or greater than a predetermined value.

7. A disk drive, comprising:
   a magnetic disk that includes a plurality of servo frames and a plurality of user data areas;
   a magnetic head that, while flying relative to the magnetic disk, writes data into and reads data from the magnetic disk;
   a servo gain generation unit that makes correction to servo data read from one of the servo frames to generate a servo gain value;
   a difference recording unit that records a first servo gain value difference between a normal servo gain value of an N-th servo frame and a normal servo gain value of an (N+1)-th servo frame in a corresponding servo frame in advance, where N is an integer, said normal servo gain value being a servo gain value when the magnetic head flies normally relative to the magnetic disk in the corresponding servo frame;
   a reference servo gain generation unit that, during a writing operation, reads out the first servo gain value difference recorded in the corresponding servo frame associated with one of the user data areas, and adds the first servo gain value difference to a servo gain value of a first servo frame immediately preceding a second servo frame corresponding to a writing position so as to calculate a reference servo gain value;
   a writing forbidding unit that calculates a second servo gain value difference between the servo gain value generated by the servo gain generation unit and the reference servo gain value from the reference servo gain generation unit, and forbids the magnetic head writing data into the magnetic disk when the second servo gain value difference is equal to or greater than a predetermined value.

8. The disk drive as claimed in claim 7, wherein the second servo gain value difference is recorded in the servo frame to be appended to magnetic head position correction data recorded in the servo frame.

9. A disk drive, comprising:
- a magnetic disk that includes a plurality of servo frames and a plurality of user data areas;
- a magnetic head that, while flying relative to the magnetic disk, writes data into and reads data from the magnetic disk;
- a servo gain generation unit that makes correction to servo data read from one of the servo frames to generate a servo gain value;
- a storage unit that stores an average normal servo gain value in advance, and stores first servo gain value differences between the average normal servo gain value and normal servo gain values in respective servo frames in advance, said average normal servo gain value being an average servo gain value when the magnetic head flies normally relative to the magnetic disk, each of the normal servo gain values being a servo gain value when the magnetic head flies normally relative to the magnetic disk in the corresponding one of the servo frames;
- a reference servo gain generation unit that, during a writing operation, reads out the first servo gain value difference from the corresponding servo frame in correspondence to a writing position, reads out the average normal servo gain value from the storage unit, and calculates a reference servo gain value by summing the first servo gain value difference and the average normal servo gain value, and
- a writing forbidding unit that calculates a second servo gain value difference between the servo gain value generated by the servo gain generation unit and the reference servo gain value from the reference servo gain generation unit, and forbids the magnetic head writing data into the magnetic disk when the second servo gain value difference is equal to or greater than a predetermined value.

10. A write control circuit, comprising:
- a comparison unit that compares a servo gain value obtained from a servo frame corresponding to a writing position to a normal servo gain value of the servo frame, said normal servo gain value being measured in advance and being a servo gain value when a magnetic head flies normally relative to a magnetic disk; and
- a writing forbidding unit that forbids the magnetic head writing data into the magnetic disk when a difference between the servo gain value and the normal servo gain value is equal to or greater than a predetermined value.

11. The write control circuit as claimed in claim 10, wherein a reference servo gain value is the normal servo gain value.

12. The write control circuit as claimed in claim 10, wherein the reference servo gain value is obtained by adding a first servo gain value difference to a servo gain value of a first servo frame immediately preceding a second servo frame corresponding to a writing position, said first servo gain value difference being a difference between a first normal servo gain value of the first servo frame and a second normal servo gain value of the second servo frame.

* * * * *